UNITED STATES PATENT OFFICE.

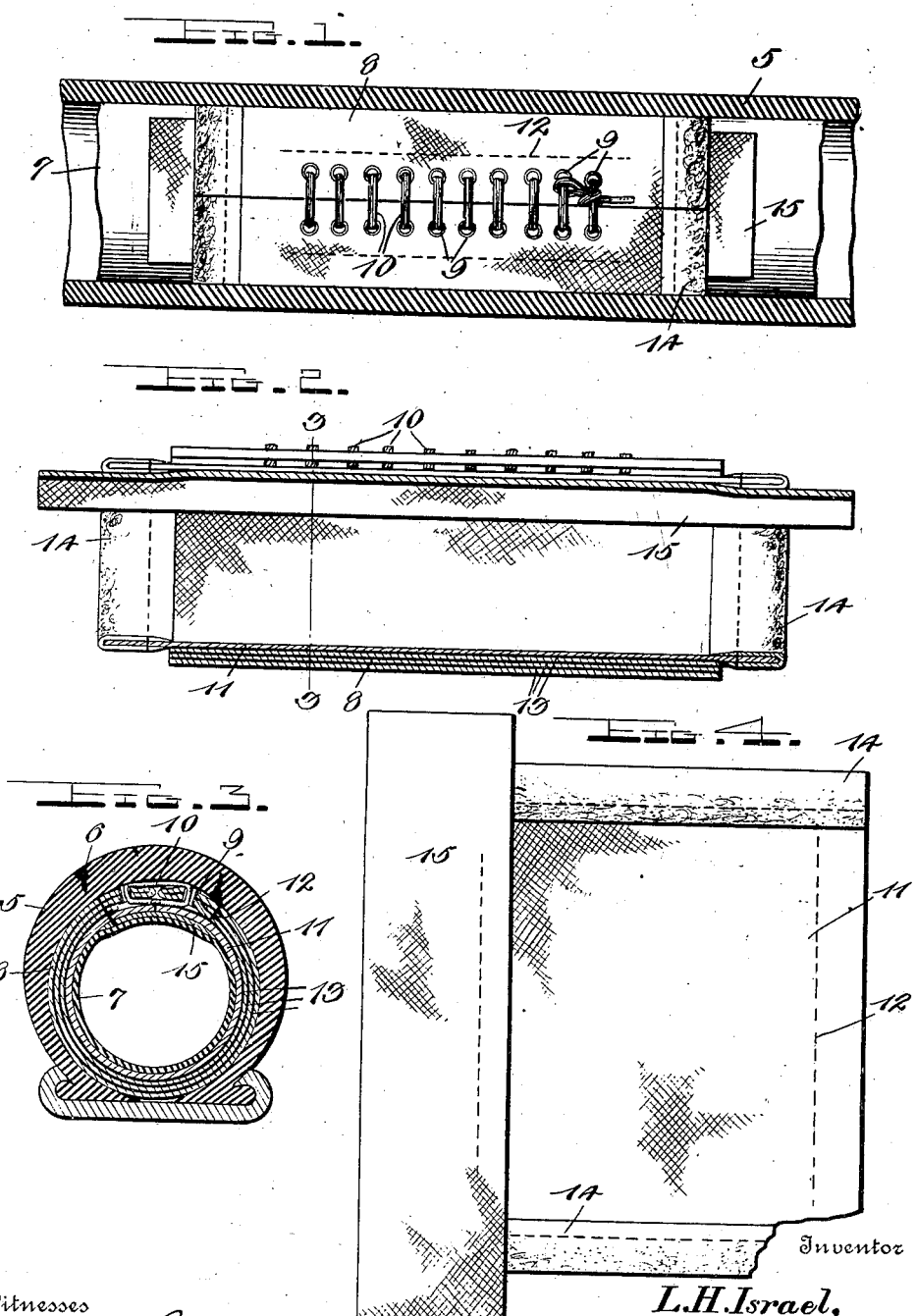

LON H. ISRAEL, OF FAIRFIELD, IOWA.

BLOW-OUT GUARD FOR INNER TUBES.

1,122,760.     Specification of Letters Patent.     Patented Dec. 29, 1914.

Application filed December 9, 1911, Serial No. 664,887. Renewed September 15, 1914. Serial No. 861,921.

*To all whom it may concern:*

Be it known that I, LON H. ISRAEL, a citizen of the United States, residing at Fairfield, in the county of Jefferson and State of Iowa, have invented certain new and useful Improvements in Blow-Out Guards for Inner Tubes, of which the following is a specification, reference being had to the accompanying drawings.

This invention relates to blow-out guards or patches for the inner tubes of vehicle tires, the object of the invention being to provide a device of this character which is easily and quickly attachable to the inner tube and which will effectually prevent the same from protruding through a puncture hole or weakened portion in the outer casing of the tire.

Another object of the invention resides in the provision of a guard or patch for the above purpose consisting of a body member of non-elastic material provided with lacing eyelets, an inner lining for said body of greater length than the same having felt or other non-abrasive binding material secured to its end edges to prevent friction upon the inner tube, and a protecting tongue secured to one of the longitudinal edges of said inner lining and provided with an overlapping flap to lie beneath the laced edges of the body and against the inner tube, said tongue permitting of the equal expansion of the end portions of the guard or patch and preventing the tube from being blown back between the patch and the outer casing of the tire.

A still further object of the invention is to provide a patch for the inner tubes of pneumatic tires which is simple and durable in construction, may be inexpensively manufactured and will efficiently perform the function for which the same is devised.

With the above and other objects in view, the invention consists of the novel features of construction, combination and arrangement of parts hereinafter fully described and claimed, and illustrated in the accompanying drawings, in which—

Figure 1 is a view showing my improved guard or patch applied to the inner tube of the tire, the tire casing being shown in section; Fig. 2 is a longitudinal section; Fig. 3 is a section taken on the line 3—3 of Fig. 2; and Fig. 4 is a plan view showing the patch or guard open.

Referring in detail to the drawing 5 designates the outer casing of a pneumatic tire such as is commonly used on motor vehicle wheels, and 6 indicates a puncture hole in said tire casing. The inner tube 7 is adapted to be arranged within the outer casing of the tire in the usual manner and to that portion of the tube underlying or adjacent to the opening in the tire casing, my improved patch or guard is adapted to be applied.

The guard comprises a fabric body formed from a single length of canvas or other non-elastic material indicated at 8. The ends of this canvas body are folded upon the central portion thereof so that the body of the guard is of a three-ply thickness. The end edges of the body of the guard adjacent to the folds thereof are provided with a plurality of eyelets 9 arranged in spaced relation to receive a suitable lace 10. To the innermost fold of the fabric body, an inner lining also of canvas or similar fabric to the body, indicated at 11 is secured. This lining as well as the several layers or plies of the fabric body are securely stitched together as indicated at 12, the rows of stitching being located at the ends of said inner lining and inwardly of the lacing eyelets in the body. Between the inner lining and the body and also between the several plies of said body the felt or rubber sheets 13 are arranged, said sheets being provided to eliminate friction which would otherwise be induced between the several canvas layers. The body 8 as well as the inner lining 11 thereof are preferably cut or woven on the bias whereby a maximum of durability is obtained in the use of the device.

It will be noted that the edges of the inner lining 11 at the ends of the guard extend beyond the edges of the body, and these extending edges of said inner lining are provided with binding strips of felt or rubber 14, their purpose also being to frictionally engage upon the inner tube and prevent movement of the guard with relation to said tube. To one end of the inner lining 11 a tongue piece 15 is stitched at its central portion, the end portions of said tongue-piece being free and extending longitudinally upon the inner tube beyond the ends of the patch. By securing this tongue only at its central portion to said lining, an equal expansion of the end portions of the guard or patch when the tube is inflated is permitted, said tongue also obviating the liability of the rubber being blown between the outer surface of the patch and the inner wall of the tire casing. It will further be noted that one of the longitudinal edge portions of the tongue 15 extends beyond the eyeleted edge of the body 8 and forms a flap to extend beneath the opposite eyeleted edge of said body to prevent the soft rubber of the inner tube being caught or pinched between the opposed edges of the patch body when they are brought together and tightly laced.

By means of my improved tube guard or patch, the period of usefulness of tire casings is greatly prolonged as they may still be employed after being weakened by hard usage, without liability of injury to the inner tube. The patch or guard may also be easily and quickly applied to the tube and does not interfere in any manner with the proper inflation thereof. Owing to the superimposed layers of canvas which provide a substantially four-ply cover on the guard for the tube, the patch is rendered impervious to water and also reduces the liability of puncture of said tube at the weakened portion of the tire to a minimum. When the guard or patch is not in use, it may be folded into small compass and placed in the pocket or compactly stored.

Owing to the simplicity of the construction of my improved tube guard, it will be obvious that the same can be manufactured at small cost and that it is also highly durable and efficient in practical use.

While I have shown and described the preferred construction and arrangement of the various parts, it will be understood that the device is susceptible of considerable modification without departing from the essential feature or sacrificing any of the advantages thereof.

Having thus described the invention what is claimed is:—

A blow-out guard for inner tubes comprising a multiple-ply non-elastic body, an inner lining for said body extending beyond the opposite ends thereof, said lining and the several plies of the body being stitched together, friction inducing binding strips secured to the projecting ends of said lining, and a tongue secured at its central portion to one end of the lining and extending beyond the bound edges of the lining longitudinally upon the tube, and means for securing the ends of the body together around the tube.

In testimony whereof I hereunto affix my signature in the presence of two witnesses.

LON H. ISRAEL.

Witnesses:
E. F. SIMMONS,
B. F. SIMMONS.